United States Patent [19]
Gerken

[11] Patent Number: 5,615,346
[45] Date of Patent: Mar. 25, 1997

[54] METHOD AND SYSTEM FOR A PIANO BAR BROWSER OF INFORMATION SETS

[75] Inventor: Christopher H. Gerken, Apex, N.C.

[73] Assignee: International Business Machines Corporation, Armonk, N.Y.

[21] Appl. No.: 370,773

[22] Filed: Dec. 23, 1994

[51] Int. Cl.$^6$ .................................................. G06F 3/00
[52] U.S. Cl. .......................... 395/341; 395/349; 395/352; 395/357
[58] Field of Search ........................... 395/152, 154–161, 395/139; 345/117–120, 123–125, 131, 146, 902

[56] References Cited

U.S. PATENT DOCUMENTS

| | | | |
|---|---|---|---|
| 4,831,556 | 5/1989 | Oono ........................................ | 395/157 |
| 5,295,242 | 3/1994 | Mashruwala et al. .................... | 395/159 |
| 5,339,391 | 8/1994 | Wroblewski et al. .................... | 395/157 |
| 5,479,600 | 12/1995 | Wroblewski ............................. | 395/157 |
| 5,506,951 | 4/1996 | Ishikawa ................................. | 395/157 |
| 5,510,808 | 4/1996 | Cina, Jr. et al. ........................ | 345/123 |

OTHER PUBLICATIONS

WordPerfect® Filemanager for Windows v 1.1, WordPerfect Corp., 1992, screen pp. 1–7.
Simpson, "Mastering WordPerfect® 5.1 & 5.2 for Windows™", Sybex, 1993, pp. 415–418.
Foley et al, "Computer Graphics", Addison–Wesley Pub. Co., 1987, pp. 406–408.

*Primary Examiner*—Mark R. Powell
*Assistant Examiner*—John E. Breene
*Attorney, Agent, or Firm*—Gregory M. Doudnikoff

[57] ABSTRACT

A system and method are provided for permitting a user to easily navigate through a browser and know the relative position of the displayed portion of the browser at all times. A piano bar is provided which includes one key which corresponds to each set of information logically available within the browser. The keys are preferably of equal size, and the number and size of keys are changed dynamically as the number of sets of information is changed by the user. The keys which correspond to the sets of information in the browser hierarchy which are being displayed by the browser at any given time are visually distinguishable from the keys which correspond to the other list boxes in the hierarchy. The keys in the piano bar may be manipulated by the user to scroll through the hierarchy of sets of information.

14 Claims, 4 Drawing Sheets

METHOD AND SYSTEM FOR A PIANO BAR BROWSER OF INFORMATION SETS

BACKGROUND OF THE INVENTION

1. Field of the Invention

The present invention relates to a system and method for enabling a user of software to intuitively navigate through an ordered collection of interrelated sets of information. More particularly, the present invention relates to a system and method for intuitively showing users of software the logical location of sets of information being displayed within an ordered collection of such sets, and enabling users to navigate through the sets of information.

2. Description of the Related Art

A major effort has been underway for several years to make computers easier to use. With respect to computer software, these efforts are lead by efforts to make graphical user interfaces (GUIs) of the software more intuitive and user friendly. Icons, buttons, scroll bars are examples of GUI improvements which have been introduced which make using computer software easier and more intuitive for both novices and experts.

One area in which improvement has proven to be elusive is associated with the display of browsers. Generally, a browser is the portion of a user interface to a computer software program or application which manages a collection of multiple lists or sets of information or data or objects which are interrelated. Users typically need to map or navigate through the lists in the collection and typically add and delete lists from a hierarchy or trail of lists. Logically, the hierarchy usually goes from left to right, but only a few lists can be physically displayed at any given time, and other directions are possible for the hierarchy, such as top to bottom, etc.

The standard browser is rather difficult to use, and improvements have been elusive. This is due to the limited amount of space available on most computer screens and the quantity of data contained in lists that the browser is attempting to provide to a user for use. A typical browser displays four or fewer adjacent containers of some type, such as list boxes, each containing a list from the collection of lists. The list boxes typically have the same dimensions and are displayed horizontally across a display device. Each list box contains a list of related data or objects. Typically, a user selects an item in the last list of the hierarchy, and a new list of data or objects related to the selected item is provided in a new list box to the immediate right of the list box including the selected item; thus, the concept of a hierarchy or trail from left to right. The trail of related list boxes can become quite long. However, as mentioned above, only four or fewer are typically displayed at any one time on the display screen. This presents a navigational problem to the user. The user will often want to know how many lists are in the trail, and the relative position in the trail of the list boxes being displayed, and will want to be able to quickly and intuitively cause desired list boxes to be displayed.

One attempt to solve this problem has been provided by Next Computer, Inc. of Redwood City, Calif. in its Digital Librarian product. The Next Computer solution employs relatively large icons with its browser to provide the user with browser navigation information. However, this approach utilizes a relatively large amount of valuable screen space, and employs a different icon for every type of list. The volume of space required for this approach and the complexity for a developer associated with designing different icons for each type of list which are intuitive makes this approach less than optimal.

Accordingly, a need exists for a browser which informs the user of the relative location of the displayed list boxes, is easy to navigate through and functionally intuitive, and uses a minimum of valuable screen real estate.

SUMMARY OF THE INVENTION

Accordingly, an object of the present invention is to provide a system and method which provides control for a browser which are easy to use.

Another object of the present invention is to provide a simplified and intuitive browser which consumes a minimum of screen space.

Other objects and advantages of the present invention will be set forth in part in the description and the drawings which follow and, in part, will be obvious from the description, or may be learned by the practice of the invention.

To achieve the foregoing objects, and in accordance with the purpose of the invention as broadly described herein, a visual navigation tool is provided for use with a collection of ordered sets of interrelated information which are displayed or available for display in a graphical user interface of a computing environment, comprising a vertically-narrow horizontal region in the graphical user interface situated proximate to the displayed sets of interrelated information; and one bar corresponding to each of the sets of interrelated information in the collection, the bars being distributed within the region to intuitively indicate the relative position of the set associated with each of the bars within the collection, wherein the bars associated with the sets which are displayed in the graphical user interface are visually distinguished from the bars not associated with the sets being displayed.

The visual navigation tool may further comprise means for causing the sets being displayed in the graphical user interface to change in response to user selection of one of the bars so that the set associated with the selected bar, if not already displayed, is displayed; and means for visually distinguishing the bars associated with the sets being displayed after a change in the displayed sets is initiated by the causing means. The visual navigation tool may further comprise means for adding a new bar whenever a new set of information is added to the collection, the new bar being placed in the region relative to the bars to indicate the relative position of the new set within the collection, and resizing the bars to make space within the region for the new bar. Further, the visual navigation tool may further comprising means for deleting bars which correspond to sets of information which are deleted from the collection.

In addition, in a graphical user interface in a computing environment, the present invention provides an object for dynamically displaying status information regarding an ordered collection of sets of interrelated information logically available to a user, comprising means for displaying a horizontal region in the graphical user interface; and means for displaying a bar within the region which corresponds to each of the sets of information logically available, each of the bars being placed in the region in a location corresponding to a logical position of its corresponding set in the ordered collection.

The object may further comprise means for dynamically adding new bars to or deleting existing bars from the region when new sets of information are added to the collection or deleted from the collection, respectively. Further, the bars may be of substantially equal size and disposed adjacent to each other horizontally across the region, and the bars being resized as the new bars are added or the existing bars are deleted in response to a change in the ordered collection. Additionally, the bars which correspond to the sets of information which are being displayed in the graphical user interface may be visually distinguished from the other bars. The object may further comprise means for scrolling the sets of information to display a selected set of information when the bar which corresponds to the selected set of information is selected by a user. Preferably, the bars which are visually distinguished dynamically change to the bars which correspond to the sets of information being displayed when the sets being displayed are changed.

A method is also provided for providing relative positional information in a graphical user interface of sets of information in an ordered collection logically available in a computing environment where at least one of the sets is being displayed in the graphical user interface, comprising the steps of displaying a region comprising keys placed therein, each of the keys corresponding to one of the sets of information and placed within the region in a location indicative of a logical location of its corresponding set in the collection; and visually distinguishing the keys which correspond to the sets of information being displayed in the graphical user interface at any given time.

The method may further comprise the step of changing which sets are displayed in the graphical user interface in response to the manipulation of the keys by a user, or the step of adding a new key to the region when a new set is added to the collection. Preferably, the keys are all substantially an identical size and shape. The method may further comprise the step of resizing the keys when a new key is added so that space for the new key is provided in the region.

The present invention will now be described with reference to the following drawings, in which like reference numbers denote the same elements throughout.

DESCRIPTION OF THE PREFERRED EMBODIMENT

Figure 1:
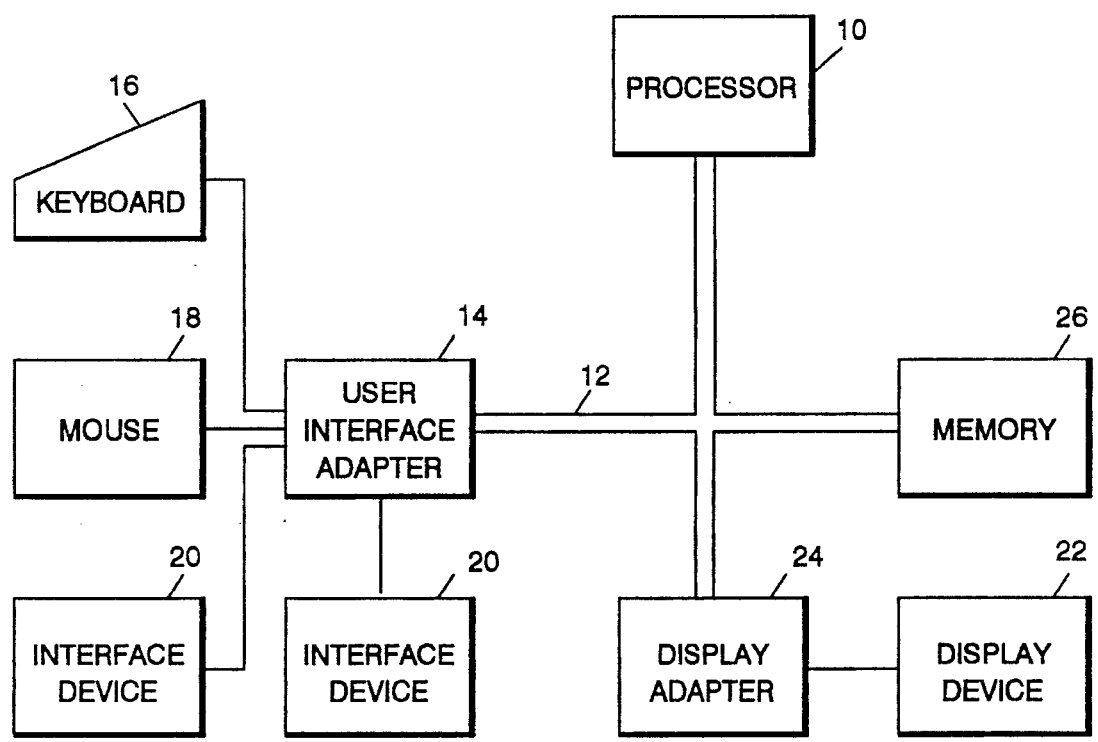
FIG. 1 is a block diagram of a computer hardware environment in which the present invention may be practiced.

The present invention may be performed in any of a variety of known computing environments. FIG. 1 illustrates a representative hardware environment in which the present invention may be practiced. The environment includes a processor 10, which may be microprocessor of a workstation or personal computer or the like. A bus 12 is employed to connect and enable communication between the processor 10 and the components of a user station in accordance with known techniques. The user station will typically include a user interface adapter 14, which connects the processor 10 via the bus 12 to one or more interface devices, such as a keyboard 16, a mouse 18, and/or other user interface devices 20, which can be any user interface device, such as a touch sensitive screen, digitized pen entry pad, etc. The bus 12 also connects a display device 22, such as an LCD screen or a CRT, to the processor 10 via a display adapter 24. The bus 12 also connects the processor 10 to memory 26, which can include ROM, RAM, etc.

One common arena in which the problems which the present invention solves occur is in object oriented programming. The problems are especially acute for developers of object oriented software applications. In object oriented programming, libraries of classes are provided for use by a developer. An application developed using object oriented software is basically a set of instances of the available classes. Each class includes various methods, which are basically the actions which are performed during execution of an object oriented application. Each method includes a number of messages, which are sent to other classes in the application whenever the given method of the class being invoked is invoked. Given the interrelationships of the various components of object oriented software, it becomes clear why browsers are employed and why the ability to easily navigate through a browser is critical to a user. For example, if a developer needs to rename a method in an application, the developer would have to navigate through a browser which would include a list box of the available applications, a list box containing a list of classes in the selected application, a list box containing a list of methods in a selected class, a list box of all senders of a selected method, a list box of the names of the associated messages with a selected method, etc. To be able to navigate easily and intuitively through a browser having a set of list boxes as described above is imperative.

List boxes are one type of container in which a set of information or a list from a collection of sets or lists may be displayed. Although many types of containers may be employed in GUI components which display interrelated sets of information, list boxes are employed in the preferred embodiment. A browser of the type illustrated in FIGS. 2 and 3 is employed in the preferred embodiment, but its actual form may have a different appearance.

The above mentioned aspects of object oriented programming are well-known to those skilled in the art, and will not be further described here. The preferred embodiment of the present invention as discussed below is implemented in Smalltalk, which is an object oriented language. The actual techniques involved with causing the GUI constructs described below to be displayed and changed are also well known to those skilled in the art, and will not be described in detail.

Figure 2:
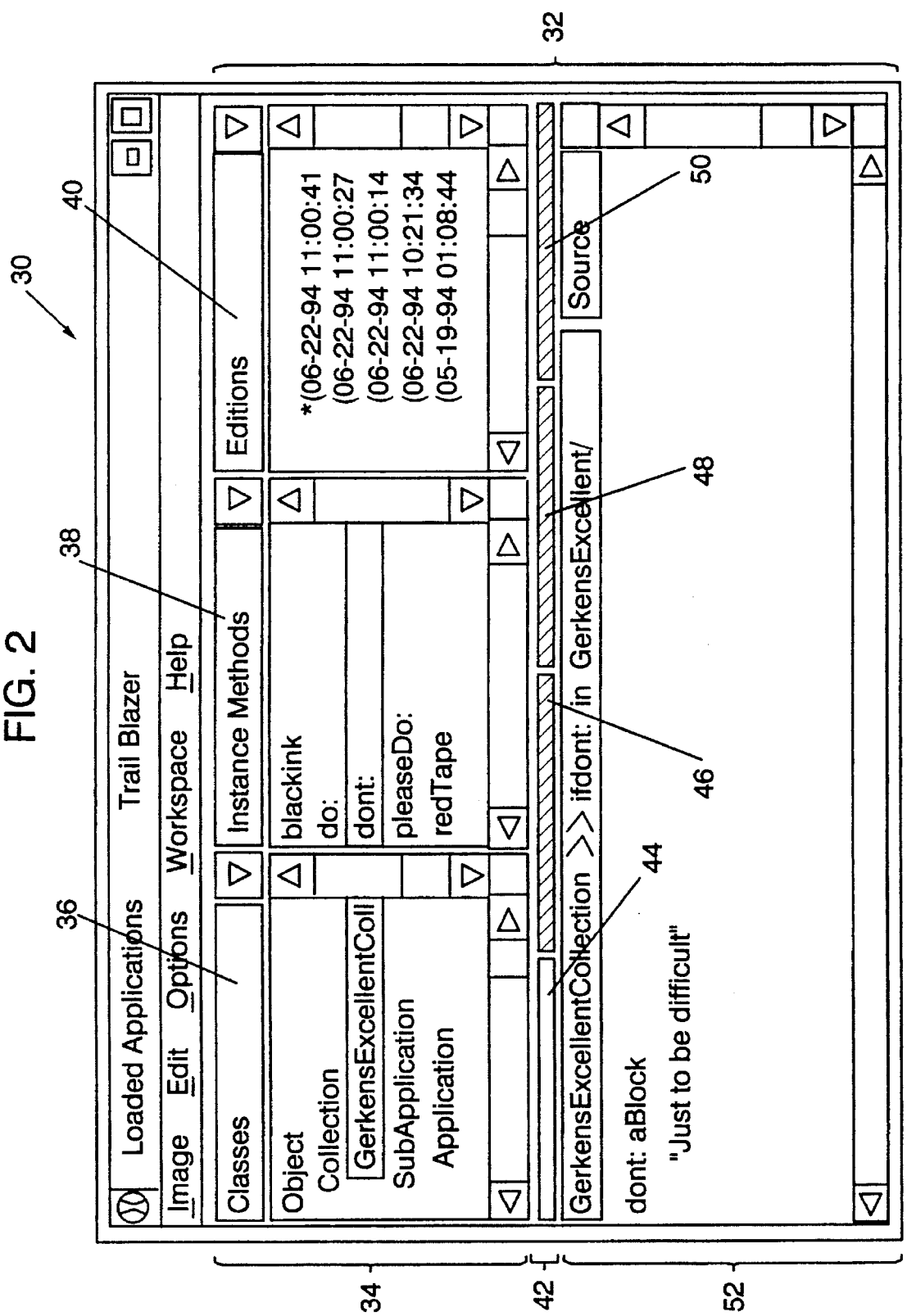
FIG. 2 illustrates a screen from a display device for a software program utilizing the browser navigation tool in accordance with the present invention.
Figure 3:
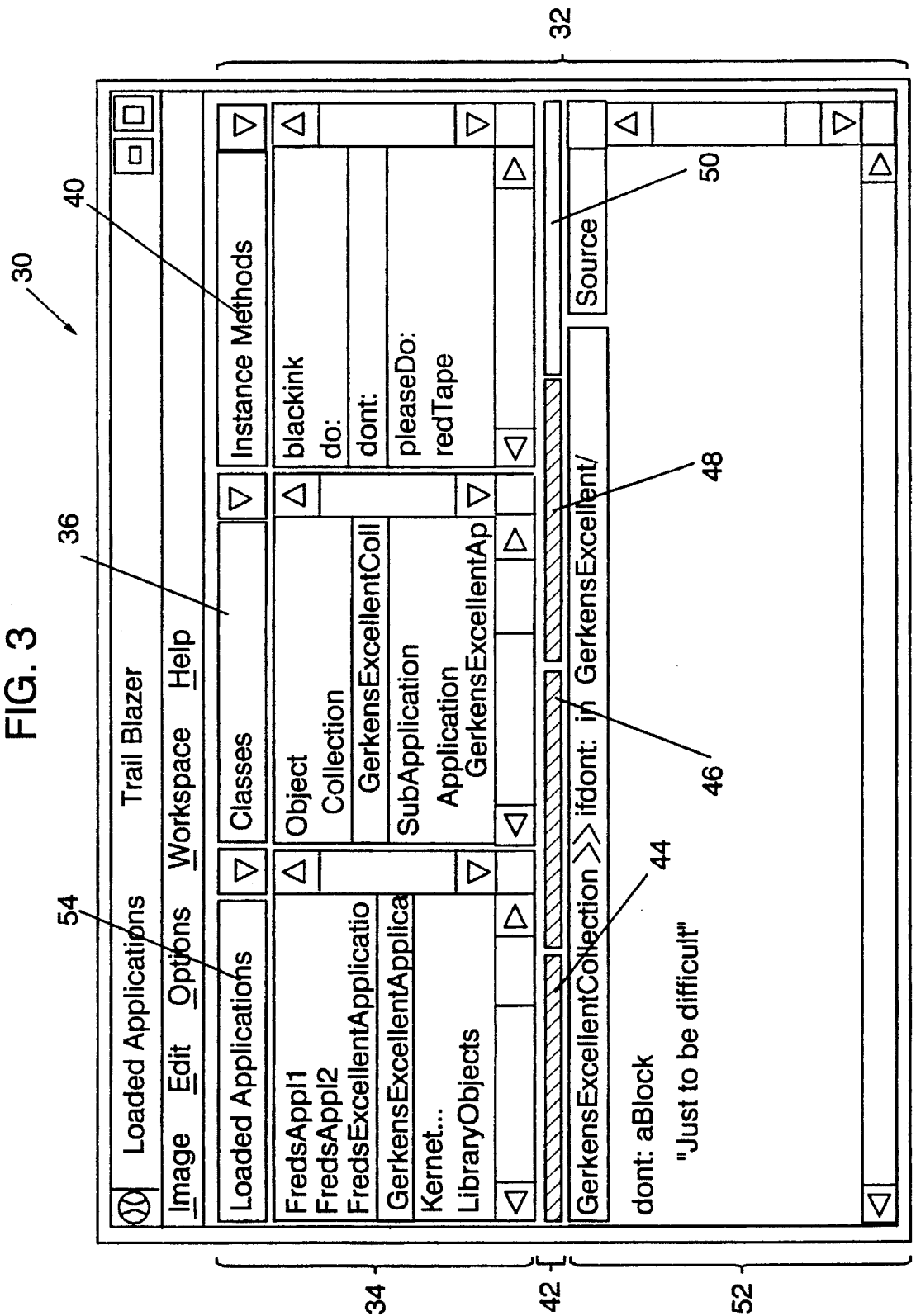
FIG. 3 illustrates the screen of FIG. 2 after scrolling one list box to the left.
Figure 4:
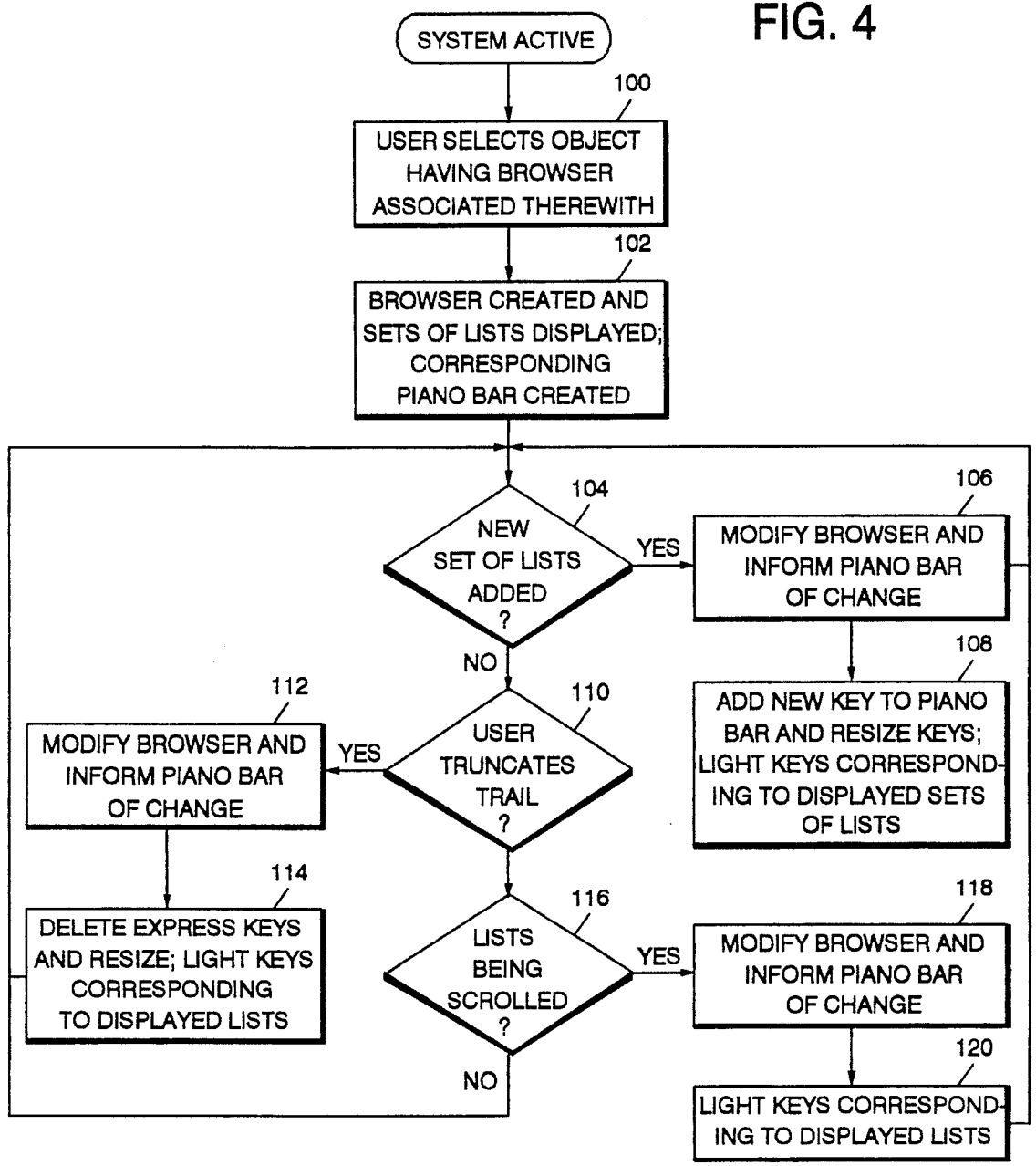
FIG. 4 is a flowchart which illustrates the detailed operation of the present invention.

Referring now to FIGS. 2 through 4, the present invention will now be described in detail. FIG. 2 illustrates a window 30 from an application which employs a browser according to the present invention. The window 30 is displayed to a user via a display device. The window 30 includes a variety of title bars and scroll bars which are known in the art and will not be described herein. A browser 32 of the window 30 includes a list box portion 34 which includes three list boxes 36, 38, 40. The window 30 also includes a piano bar 42 which includes four keys 44, 46, 48, 50, one for each list box in the browser hierarchy. A work space 52 is provided below the browser 32, and is not pertinent to the present invention.

The four keys 44, 46, 48, 50 of the piano bar 42 indicate that the browser 32 logically comprises four active list boxes in its hierarchy. Given that display devices having screens larger than 14 inches in size are expensive and still relatively rare, three list boxes from a browser are all a typical window can adequately display. The present invention will be described in terms of three list boxes being displayed, although browsers may be designed which display more list boxes or fewer list boxes at any given time.

As mentioned, the browser 32 logically comprises four different list boxes. From right to left, at the bottom of the hierarchy is the "Editions" list box 40. Displayed to the left of the "Editions" list box 40 is the "Instance Methods" list box 38. To the left of the "Instance Methods" list box 38 is the "Classes" list box 36. To the logical left of the "Classes" list box 36 is a list box which is not displayed in the window 30. This fourth list box is at the top of the hierarchy or beginning of the trail, and in this example is a "Loaded Applications" list box 54 (FIG. 3), which includes a list of the loaded or available applications in an object oriented development environment. Upon selecting one of the applications in the "Loaded Applications" list by clicking with a mouse on the desired application name, a developer is able to select from a number of lists related to a selected application, one of which is a list of the classes included in the application. Upon selecting one of the classes from within the "Classes" list box 36, the developer could select from available lists which are related to the selected class, including a list of instance methods. Once the user has selected one of the instance methods, the user could select from a number of lists which are related to the selected instance method, including a list of editions. In this manner a developer creates a hierarchy of lists which are displayed via the browser with list boxes. The hierarchy has a definite trail of list boxes, which is indicative of the relationships between the sets of lists.

The trail in this example ends at the "Editions" list box 40, which is at the bottom of the hierarchy of lists. Upon selecting one of the editions in the "Editions" list box 40, a new list box could be created from a set of available lists related to the selected edition, and thus the trail and the hierarchy would be extended to five list boxes, of which only three would be displayed. According to the preferred embodiment, the piano bar 42 would then change itself so that it comprised five keys. At any given time, the three keys which relate to the position in the hierarchy or the trial of the displayed list boxes are lit or otherwise shaded or differentiated from the keys which correspond to the list boxes which are not displayed. In the browser 32, since the "Loaded Applications" list box is to the logical left of the "Classes" list box 36, only the three piano keys at the right are lit. Thus, by viewing the piano bar 42, a user intuitively knows that the trail consists of four list boxes, and that the last three list boxes in the hierarchy or trail are being displayed within the browser 32.

The piano bar 42 is also functional in nature. By manipulating the piano bar 42 with an appropriate interface device, such as a mouse, a user may navigate through the trail. For example, if a user clicks a mouse button when the mouse cursor is on the piano key 44, the browser as displayed to a user modifies itself so that the list boxes 54, 36, 38 are displayed, as illustrated in the browser 32 of FIG. 3. In FIG. 3, the "Loaded Applications" list box 54 is displayed at the left position of the browser 32. The "Classes" list box 36 is displayed in the center position of the browser 32, and the "Instance Methods" list box 38 is displayed at the right position of the browser 32. The "Editions" list box 40 is not displayed in the browser 32 of FIG. 3. The "Editions" list box still logically exists; however, it is to the logical right of the "Instance Methods" list box 38. The piano bar 42 of the browser 32 of FIG. 3 is also changed. The piano keys 44, 46, 48 (which correspond to the displayed list boxes 54, 36, 38, respectively) are now lit, and the piano key 50, which corresponds to the "Editions" list box, is not lit. Through such manipulation of the piano bar 42, a user is able to intuitively navigate through the list boxes of the browser 32.

As discussed, a browser may consist of a large number of list boxes. According to the preferred embodiment of the present invention, when a user clicks on one of the piano keys, that list box will be displayed in the center position of the browser. Alternatively, the selected list box may be displayed at the left position or the right position, as desired or appropriate for the given use. When the list box at the top of the hierarchy or beginning of the trail is selected, it will typically be displayed in the left position of the browser, since no other list boxes can exist to its logical left.

The function of the present invention will now be described with reference with the flowchart of FIG. 4. As is practiced presently, upon selection of an item in a GUI which has a list box associated therewith (Step 100), a browser having three list boxes (Step 102). Depending on the selected object, the left list box may be the only box containing a list. The center list box is filled with a list after the user selects an item from the list provided in the left list box and then selects from the available lists associated with the selected item. The right list box is filled with a list after the user repeats these steps with respect to the center list box. By continuing the selection process for the list contained in the list box at the logical right of the hierarchy or end of the trail, the number of list boxes which logically exists will grow to greater than three, which is the maximum number of list boxes which may be displayed at any given time in the preferred embodiment.

When the browser is created, a piano bar having three keys is also created. Preferably, as illustrated in FIGS. 2 and 3, the piano bar 42 is situated between the list box portion 34 of the browser 32 and the work space 52, although the piano bar can be located anywhere in the window. Since only three list boxes exist, all three are displayed in the window 30 and all three piano keys are lit (Step 102).

The Smalltalk logic will now be described. The browser is composed of a quantity of instances of classes or objects, and is itself an object (an instance of a browser super class). When the list box portion of the browser is created, a message is sent by the browser to the piano bar, informing the piano bar that an action has occurred with respect to the list boxes in the browser. Like the browser, the piano bar is also an object, and is composed of a quantity of objects. The piano bar object is one of the objects which comprise the browser. The piano bar sends a message back to the browser asking how many list boxes logically exist, how many list boxes are being displayed at the given time, and which fist is being displayed in the left position of the browser. Based on this information, the piano bar sizes the piano keys for display and causes the piano keys which correspond to the displayed list boxes to be lit. Each key corresponds to a particular list box, and thus has a determinable position in the hierarchy and, thus, a position within the corresponding trail of piano keys. In the preferred embodiment, the sizing of the piano keys causes piano keys of substantially equal size to be created. Thus, three piano keys of substantially equal size will be displayed to the user. As list boxes are added by the user, new piano keys are added and the piano keys are resized so that they are of equal size. The more list boxes in the hierarchy, the smaller the size of each piano key. The piano bar also causes the piano keys which relate to the list boxes in the hierarchy which are being displayed to be lit or otherwise visually distinguishable from the other piano keys.

The techniques by which a user adds or deletes list boxes from the hierarchy or trail of list boxes is well known, and will not be discussed here. What will be discussed below is what logically happens within the piano bar when the user causes a new list box to be added to the trail, causes the trail to be truncated, or wants to scroll through the trail.

If it is determined in Step 104 that the user has added a new list box, the new list box is logically added to the end of the trail, and the new list box is displayed at the right position in the browser. At this time, the piano bar changes itself. The browser sends a message to the piano bar which informs it that a change has occurred (Step 106). The piano bar responds by sending a message to the browser which asks for data relating to the total number of logical list boxes, which list boxes are being displayed, and which list box is in the left position of the browser. Based on this information, as described above, the piano bar adjusts itself. In the case of a new list box being added, the three right most keys are lit, as the new list box is added at the end of the trail or hierarchy and is displayed at the right position of the browser. The piano bar also resizes the keys so that the keys fill the piano bar region and all of the keys are the same size (Step 108).

The user always has the option to truncate the trail at any point thereon (Step 110). When this occurs, the appropriate modification is made to the list box portion of the browser, and the browser sends a message to the piano bar, informing it that a change has occurred (Step 112). The piano bar then obtains information from the browser as to how many list boxes exist after truncation and which list boxes are being displayed after the change. A user may truncate any number of list boxes off a trail at one time. For example, if the trail consists of seven list boxes, when truncating at the fifth list box, the fifth, sixth and seventh list boxes are deleted, leaving four list boxes in the trail. The three right-most list boxes in the trail will then typically be displayed. The piano bar obtains this information from the browser, causes four keys of equal size to be displayed in the piano bar portion of the browser, and lights the right three piano keys (Step 114).

The user may also manipulate the piano bar itself, such as by clicking on one of the piano keys to scroll through the list boxes so that the list box corresponding to the selected piano key is displayed (Step 116). In this situation, the piano bar sends a message to the browser informing it to display the selected list box in the center position of the browser. The browser then modifies itself to reflect the request change and informs the piano bar that a change has occurred (Step 118). The piano bar then asks for and receives information from the browser as to which list boxes are now being displayed, and lights the keys which correspond to the displayed list boxes (Step 120). Scrolling through the list boxes can also be accomplished in a number of other ways, such as through buttons which cause the browser to present a view of the list boxes which is shifted one logical list box to the left or one logical list box to the right. The buttons may be part of the piano bar object, or separate therefrom. No matter how the scrolling is requested, the browser sends a message to the piano bar informing it that a change has occurred, and the piano bar then obtains the appropriate information from the browser so as to be able to light the piano keys which correspond to the displayed list boxes. Though preferred methods of scrolling have been discussed, a wide variety of possibilities can be used to permit a user to scroll through the trail of list boxes.

In short, the Smalltalk implementation functions in the following manner. When the browser is being displayed, the user may add to, truncate or scroll the list at any time. In accordance with the present invention, when such an action occurs, the browser informs the piano bar of the change, and the piano bar then obtains information from the browser necessary to modify the piano bar so as to indicate the length of the trail and the list boxes from within the trail which are being displayed by the browser after the change.

While the preferred embodiment of the present invention has been described, variations and modification to that embodiment may occur to the those skilled in the art once they learn of the basic inventive concepts. Therefore, it is intended that the appended claims shall be construed to include both the preferred embodiment and also such variations and modifications as fall within the spirit and scope of the invention.

I claim:

1. A visual navigation tool for use with a collection of ordered sets of interrelated information which are displayed or available for display in a graphical user interface of a computing environment, comprising:

a vertically-narrow horizontal region in the graphical user interface situated proximate to the displayed sets of interrelated information; and one bar corresponding to each of the set of interrelated information in the collection, said bars being distributed within said region to intuitively indicate the relative position of the set associated with each of said bars within the collection, wherein said bars associated with the sets which are displayed in the graphical user interface have visual characteristics to distinguish them from said bars not associated with the sets being displayed.

2. A visual navigation tool according to claim 1, further comprising:

means for causing the sets being displayed in the graphical user interface to change in response to user selection of one of said bars so that the set associated with the selected bar, if not already displayed, is displayed; and means for visually distinguishing the bars associated with the sets being displayed after a change in the displayed sets is initiated by said causing means.

3. A visual navigation tool according to claim 1, further comprising means for adding a new bar whenever a new set of information is added to the collection, the new bar being placed in said region relative to said bars to indicate the relative position of the new set within the collection, and resizing said bars to make space within said region for the new bar.

4. A visual navigation tool according to claim 1, further comprising means for deleting bars which correspond to sets of information which are deleted from the collection.

5. In a graphical user interface in a computing environment, an object for dynamically displaying status information regarding an ordered collection of sets of interrelated information logically available to a user, comprising:

means for displaying a horizontal region in the graphical user interface;

means for displaying a bar within the region which corresponds to each of the sets of information logically available, each of the bars being placed in the region in a location corresponding to a logical position of its corresponding set in the ordered collection; and means for controlling which of the sets are displayed in the graphical user interface in response to user manipulation of the bars.

6. An object according to claim 5, further comprising means for dynamically adding new bars to or deleting existing bars from the region when new sets of information are added to the collection or deleted from the collection, respectively.

7. An object according to claim 6, wherein the bars are of substantially equal size and are disposed adjacent to each other horizontally across the region, and the bars are resized as the new bars are added or the existing bars are deleted in response to a change in the ordered collection.

8. An object according to claim 5, wherein the bars which correspond to the sets of information which are being displayed in the graphical user interface are visually distinguished from the other bars.

9. An object according to claim 5, further comprising means for scrolling the sets of information to display a selected set of information when the bar which corresponds to the selected set of information is selected by a user.

10. An object according to claim 8, wherein the bars which are visually distinguished are dynamically changed to the bars which correspond to the sets of information being displayed when the sets being displayed are changed.

11. A method for providing relative positional information in a graphical user interface of sets of information in an ordered collection logically available in a computing environment where at least one of the sets is being displayed in the graphical user interface, comprising the steps of:

displaying a region comprising keys placed therein, each of the keys corresponding to one of the sets of information and placed within the region in a location indicative of a logical location of its corresponding set in the collection;

visually distinguishing the keys which correspond to the sets of information being displayed in the graphical user interface at any given time; and changing which sets are displayed in the graphical user interface in response to manipulation of the keys by a user.

12. A method according to claim 11, further comprising the step of adding a new key to the region when a new set is added to the collection.

13. A method according to claim 11, wherein the keys are all substantially an identical size and shape.

14. A method according to claim 12, further comprising the step of resizing the keys when a new key is added so that space for the new key is provided in the region.

* * * * *